(12) United States Patent
Kono

(10) Patent No.: US 9,154,313 B2
(45) Date of Patent: Oct. 6, 2015

(54) NETWORK RELAY APPARATUS AND CONTROL METHOD THEREOF

(71) Applicant: ALAXALA Networks Corporation, Kanagawa (JP)

(72) Inventor: Tomohiko Kono, Tokyo (JP)

(73) Assignee: Alaxala Networks Corporation, Kawasaki-shi (JP)

( * ) Notice: Subject to any disclaimer, the term of this patent is extended or adjusted under 35 U.S.C. 154(b) by 285 days.

(21) Appl. No.: 13/720,523

(22) Filed: Dec. 19, 2012

(65) Prior Publication Data
US 2014/0003443 A1    Jan. 2, 2014

(30) Foreign Application Priority Data

Jan. 17, 2012  (JP) ................................. 2012-006941

(51) Int. Cl.
| | |
|---|---|
| H04L 12/28 | (2006.01) |
| H04L 12/12 | (2006.01) |
| H04L 12/66 | (2006.01) |
| H04J 3/06 | (2006.01) |

(52) U.S. Cl.
CPC ............... *H04L 12/12* (2013.01); *H04J 3/0697* (2013.01); *H04L 12/66* (2013.01)

(58) Field of Classification Search
None
See application file for complete search history.

(56) References Cited

U.S. PATENT DOCUMENTS

| | | | | |
|---|---|---|---|---|
| 6,292,412 | B1* | 9/2001 | Kato et al. ..................... | 365/194 |
| 6,877,087 | B1* | 4/2005 | Yamada et al. ............... | 712/226 |
| 2002/0150077 | A1* | 10/2002 | Temerinac ..................... | 370/349 |
| 2007/0201426 | A1 | 8/2007 | Shinohara et al. | |
| 2007/0201461 | A1 | 8/2007 | Shinohara et al. | |
| 2011/0302339 | A1 | 12/2011 | Umezawa | |

FOREIGN PATENT DOCUMENTS

| | | |
|---|---|---|
| JP | 2007-228491 A | 9/2007 |
| JP | 2007-316805 A | 9/2007 |
| JP | 2007-316805 A | 12/2007 |
| JP | 2011-254373 A | 12/2011 |

* cited by examiner

*Primary Examiner* — Otis L Thompson, Jr.
(74) *Attorney, Agent, or Firm* — Foley & Lardner LLP

(57) ABSTRACT

A network relay apparatus includes: a clock generation circuit, a processing circuit, a load detector and a clock cutoff circuit. The clock generation circuit is configured to generate a clock signal having periodical clock pulses. The processing circuit is configured to operate in synchronism with the clock pulses, in order to process data that is to be relayed by the network relay apparatus. The load detector is configured to detect a load of processing by the processing circuit. The clock cutoff circuit is configured to cut off supply of the clock pulses from the clock generation circuit to the processing circuit in order to partially eliminate the clock pulses at a rate corresponding to the load detected by the load detector and to provide the clock signal having the partially eliminated clock pulses to the processing circuit.

11 Claims, 11 Drawing Sheets

NETWORK RELAY APPARATUS AND CONTROL METHOD THEREOF

CROSS-REFERENCE TO RELATED APPLICATIONS

The present application claims the priority based on Japanese Patent Application No. 2012-6941 filed on Jan. 17, 2012, the disclosure of which is hereby incorporated by reference in its entirety.

BACKGROUND

The present invention relates to a network relay apparatus, such as switch or router.

The network relay apparatus has an important role of relaying data in a computer network. There has been significant performance improvement and capacity increase of the network relay apparatus, accompanied with scale expansion of the computer network and an increase in amount of data transmitted in the computer network. Such performance improvement and capacity increase of the network relay apparatus, however, tends to increase power consumption of the network relay apparatus. It is accordingly required to reduce power consumption of the network relay apparatus, i.e., to achieve power-saving of the network relay apparatus.

One proposed measure enables generation of a high clock signal having relatively high frequency and a low clock signal having relatively low frequency and switches over the clock signal used to drive a processing circuit from the high clock signal to the low clock signal, so as to achieve power-saving of the network relay apparatus (see, for example, JP 2007-228490A and JP 2007-228491A). Another proposed technique disclosed in JP 2007-316805, so-called gating, cuts off supply of a clock signal to a memory at regular intervals, so as to achieve power-saving of the network relay apparatus.

SUMMARY

The proposed measures achieve power-saving of the network relay apparatus to some extent. It is, however, required to enable a wide variety of power-saving strategies by taking into account various factors, for example, a variation in load of the network relay apparatus according to the amount of data that is to be relayed, the requirement of preventing potential packet loss, or deletion of packet, and adjustment of transmission of signals between internal circuits of the network relay apparatus.

By taking into account the above problem, the object of the invention is to provide technology that achieves power-saving of the network relay apparatus.

In order to solve at least part of the above problem, the invention provides various aspects and embodiments described below.

First Aspect

A network relay apparatus of the first aspect is directed to a network relay apparatus, comprising: a clock generation circuit configured to generate a clock signal having periodical clock pulses; a processing circuit configured to operate in synchronism with the clock pulses, in order to process data that is to be relayed by the network relay apparatus; a load detector configured to detect a load of processing by the processing circuit; and a clock cutoff circuit configured to cut off supply of the clock pulses from the clock generation circuit to the processing circuit in order to partially eliminate the clock pulses at a rate corresponding to the load detected by the load detector and to provide the clock signal having the partially eliminated clock pulses to the processing circuit. The network relay apparatus of this aspect increases the rate of partially eliminating the clock pulses that are to be supplied to the processing circuit, with a decrease in load of the processing circuit. The increasing rate decreases the operating frequency of the processing circuit and thereby reduces power consumption of the processing circuit. This accordingly achieves power-saving of the network relay apparatus according to the load of the processing circuit. The operating frequency of the processing circuit is adjusted by cutting off the supply of the clock pulses to the processing circuit (gating). Compared with adjustment of the operating frequency using at least one of an oscillator, a multiplier and a frequency divider, such adjustment of the operating frequency advantageously shortens the time required for changeover of the operating frequency and prevents potential packet loss accompanied with adjustment of the operating frequency.

Second Aspect

In the network relay apparatus of the first aspect, the processing circuit may include a first partial circuit and a second partial circuit. The load detected by the load detector may be both a load of the first partial circuit and a load of the second partial circuit that are detected individually. The clock generation circuit may include: a first clock generation circuit configured to generate a first clock signal having first clock pulses, as a clock signal that is to be supplied to the first partial circuit; and a second clock generation circuit configured to generate a second clock signal having second clock pulses, as a clock signal that is to be supplied to the second partial circuit. The clock cutoff circuit may include: a first clock cutoff circuit that cuts off supply of the first clock pulses from the first clock generation circuit to the first partial circuit in order to partially eliminate the first clock pulses at a rate corresponding to the load of the first partial circuit detected by the load detector and provides the first clock signal having the partially eliminated first clock pulses to the first partial circuit; and a second clock cutoff circuit that cuts off supply of the second clock pulses from the second clock generation circuit to the second partial circuit in order to partially eliminate the second clock pulses at a rate corresponding to the load of the second partial circuit detected by the load detector and provides the second clock signal having the partially eliminated second clock pulses to the second partial circuit.

The network relay apparatus of this aspect can individually adjust the operating frequencies of the first and the second partial circuits according to the loads of the first and the second partial circuits. This configuration is not limited to the application of the two partial circuits included in the processing circuit but is generally applicable to two or more partial circuits included in the processing circuit to individually adjust the operating frequencies of the two or more partial circuits according to the loads of the two or more partial circuits.

Third Aspect

In the network relay apparatus of either one of the first and second aspects, the clock generation circuit may generate a plurality of clock signals respectively having different frequencies, and the clock cutoff circuit may cut off supply of respective clock pulses of the plurality of clock signals from the clock generation circuit to the processing circuit in order to partially eliminate the respective clock pulses of the plurality of clock signals synchronously at a rate corresponding to the load detected by the load detector and provide the plurality of clock signals having the partially eliminated respective clock pulses to the processing circuit. The network relay apparatus of this aspect can readily adjust the plurality of clock signals respectively having different frequencies.

Fourth Aspect

In the network relay apparatus of any one of the first through third aspects, the processing circuit may include a buffer circuit configured to temporarily store information that is to be processed by the processing circuit, and the load detector may detect the load based on an amount of data stored in the buffer circuit. The network relay apparatus of this aspect can adjust the operating frequency of the processing circuit based on the amount of data stored in the buffer circuit.

Fifth Aspect

In the network relay apparatus of any one of the first through fourth aspects, the network relay apparatus may further comprise a data receiver configured to receive data that is to be relayed by the network relay apparatus, from a line. The load detector may detect the load based on an amount of the data received by the data receiver. The network relay apparatus of this aspect can adjust the operating frequency of the processing circuit based on the amount of data received by the data receiver.

Sixth Aspect

In the network relay apparatus of any one of the first through fifth aspects, the network relay apparatus may further comprise an information acquirer configured to obtain information representing an amount of data transmitted in a computer network, from another network relay apparatus that cooperates with the network relay apparatus to construct the computer network. The load detector may detect the load, based on the information obtained by the information acquirer. The network relay apparatus of this aspect can adjust the operating frequency of the processing circuit based on the information from another network relay apparatus.

Seventh Aspect

In the network relay apparatus of any one of the first through sixth aspects, the processing circuit may include an interface circuit configured to mediate transmission of information to and from an additional circuit that is different from the processing circuit, and frequency of a clock signal used to drive the interface circuit may be controlled to remain constant before and after the cutoff by the clock cutoff circuit. The network relay apparatus of this aspect can adjust the operating frequency of the processing circuit without controlling transmission of signals between the interface circuit and the additional circuit.

Eighth Aspect

A control method of the eighth aspect is directed to a control method of a network relay apparatus, comprising: activating a clock generation circuit of the network relay apparatus to generate a clock signal having periodical clock pulses; operating a processing circuit of the network relay apparatus in synchronism with the clock pulses, in order to process data that is to be relayed by the network relay apparatus; activating a load detector of the network relay apparatus to detect a load of processing by the processing circuit; and activating a clock cutoff circuit of the network relay apparatus to cut off supply of the clock pulses from the clock generation circuit to the processing circuit so as to partially eliminate the clock pulses at a rate corresponding to the load detected by the load detector and providing the clock signal having the partially eliminated clock pulses to the processing circuit. The control method of this aspect increases the rate of partially eliminating the clock pulses that are to be supplied to the processing circuit, with a decrease in load of the processing circuit, thereby decreasing the operating frequency of the processing circuit and reducing power consumption of the processing circuit. This accordingly achieves power-saving of the network relay apparatus according to the load of the processing circuit. The operating frequency of the processing circuit is adjusted by cutting off the supply of the clock pulses to the processing circuit (gating). Compared with adjustment of the operating frequency using at least one of an oscillator, a multiplier and a frequency divider, such adjustment of the operating frequency advantageously shortens the time required for changeover of the operating frequency and prevents potential packet loss accompanied with adjustment of the operating frequency.

Ninth Aspect

A network relay apparatus of the ninth aspect is directed to a network relay apparatus, comprising: a processing circuit configured to process data that is to be relayed by the network relay apparatus and include an interface circuit operating to mediate transmission of information to and from an additional circuit that is different from the processing circuit; a load detector configured to detect a load of processing by the processing circuit; and a frequency adjuster configured to adjust frequency of a first clock signal used to drive the processing circuit, according to the load detected by the load detector, wherein frequency of a second clock signal used to drive the interface circuit is controlled to remain constant before and after the adjustment of the frequency of the first clock signal according to the load by the frequency adjuster. The network relay apparatus of this aspect achieves power-saving of the network relay apparatus by adjustment of the operating frequency of the processing circuit without controlling transmission of signals between the interface circuit and the additional circuit.

Tenth Aspect

In the network relay apparatus of the ninth aspect, the frequency adjuster may switch over at least one of an oscillator, a multiplier and a frequency divider to adjust the frequency of the first clock signal. The network relay apparatus of this aspect changes over at least one of the oscillator, the multiplier and the frequency divider to adjust the operating frequency of the processing circuit.

Eleventh Aspect

In the network relay apparatus of the ninth aspect, the frequency adjuster may cut off supply of clock pulses of the first clock signal to the processing circuit, so as to adjust the frequency of the first clock signal. The network relay apparatus of this aspect can adjust the operating frequency of the processing circuit by cutting off the supply of the clock pulses.

Twelfth Aspect

A control method of the twelfth aspect is directed to a control method of a network relay apparatus, comprising: activating a processing circuit of the network relay apparatus to process data that is to be relayed by the network relay apparatus; activating an interface circuit included in the processing circuit to mediate transmission of information between the processing circuit and an additional circuit that is different from the processing circuit; activating a load detector of the network relay apparatus to detect a load of processing by the processing circuit; activating a frequency adjuster of the network relay apparatus to adjust frequency of a first clock signal used to drive the processing circuit, according to the load detected by the load detector; and controlling frequency of a second clock signal, which is used to drive the interface circuit, to remain constant before and after the adjustment of the frequency of the first clock signal according to the load. The control method of this aspect achieves power-saving of the network relay apparatus by adjustment of the operating frequency of the processing circuit without controlling transmission of signals between the interface circuit and the additional circuit.

According to another aspect, there is provided the network relay apparatus, wherein the processing circuit may include a first partial circuit and a second partial circuit, and the load detected by the load detector may be a total load of the first partial circuit and the second partial circuit. The clock generation circuit may include: a first clock generation circuit configured to generate a first clock signal having first clock pulses, as a clock signal that is to be supplied to the first partial circuit; and a second clock generation circuit configured to generate a second clock signal having second clock pulses of a cycle different from the cycle of the first clock pulses, as a clock signal that is to be supplied to the second partial circuit. The clock cutoff circuit may include: a first clock cutoff circuit that cuts off supply of the first clock pulses from the first clock generation circuit to the first partial circuit in order to partially eliminate the first clock pulses at a rate corresponding to the total load of the first partial circuit and the second partial circuit detected by the load detector and provides the first clock signal having the partially eliminated first clock pulses to the first partial circuit; and a second clock cutoff circuit that cuts off supply of the second clock pulses from the second clock generation circuit to the second partial circuit in synchronism with the first clock cutoff circuit, in order to partially eliminate the second clock pulses at the rate corresponding to the total load of the first partial circuit and the second partial circuit detected by the load detector and provides the second clock signal having the partially eliminated second clock pulses to the second partial circuit. The network relay apparatus of this aspect synchronously cuts off the supply of the first clock pulse and the supply of the second clock pulse to the first partial circuit and the second partial circuit that respectively operate at different operating frequencies. This facilitates control of transmission of signals between the first partial circuit and the second partial circuit before and after the cutoff, compared with separately cutting off the supply of the first clock pulses and the supply of the second clock pulses.

The invention is not limited to the network relay apparatus or its control method described above but is implemented by any of other various applications, for example, a network system including a plurality of network relay apparatuses and a program that causes a computer to implement the functions of the network relay apparatus. The invention is not limited to any of the above aspects or embodiments but is implemented by any of other various applications without departing from the scope of the invention.

BRIEF DESCRIPTION OF THE DRAWINGS

The invention will be described with reference to the accompanying drawings in which.

DESCRIPTION OF THE EMBODIMENTS

In order to further clarify the configurations and the advantageous effects of the invention, the following describes network relay apparatuses according to the invention.

A. First Embodiment

Figure 1:
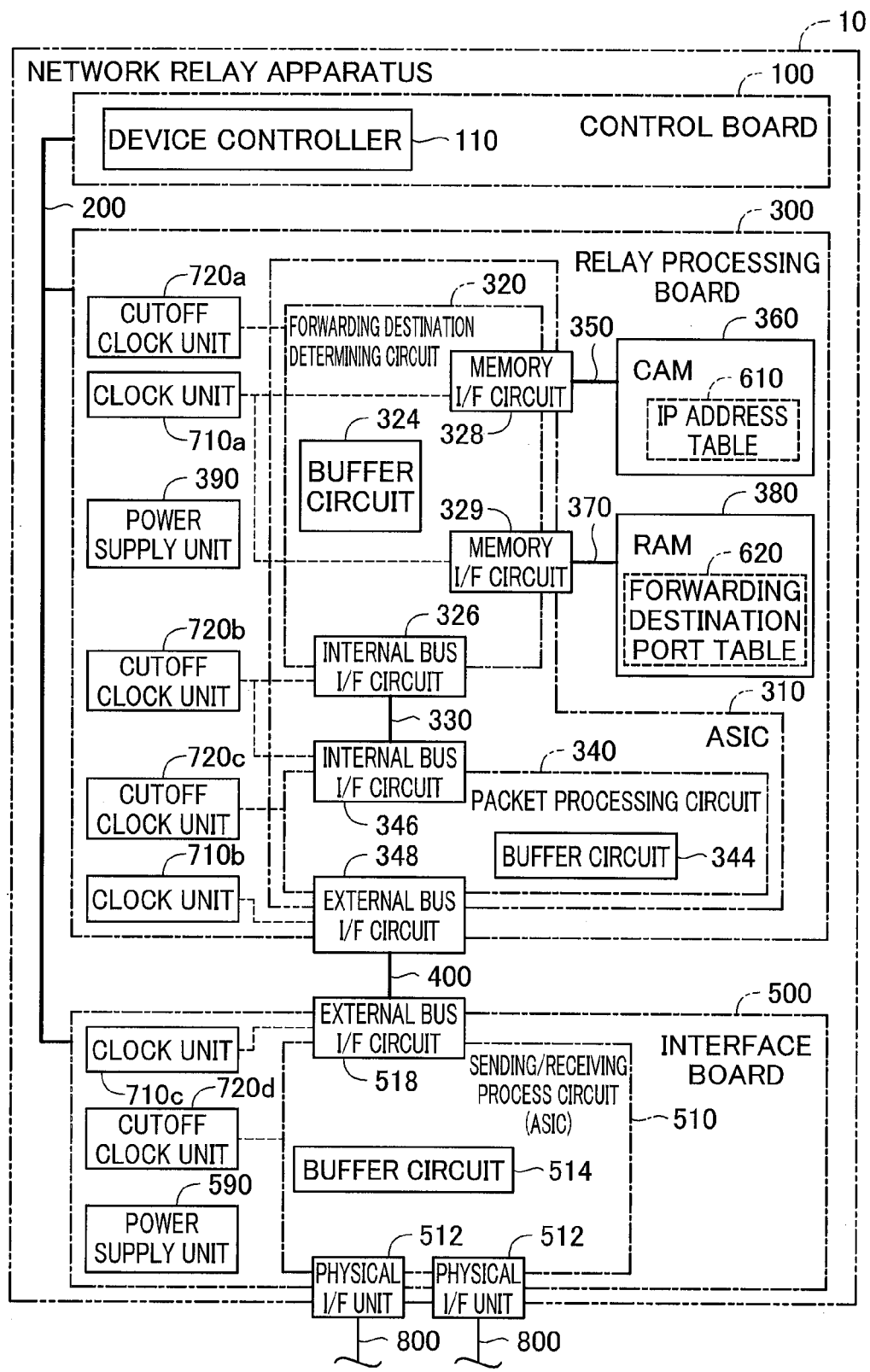
FIG. 1 illustrates the configuration of a network relay apparatus.

FIG. 1 illustrates the configuration of a network relay apparatus 10. The network relay apparatus 10 is also called, for example, a switch or a router and serves to relay data in a computer network. The network relay apparatus 10 includes a control board 100, a relay processing board 300 and an interface board 500 as electronic circuit boards with various electronic components mounted thereon. The respective numbers of the control board 100, the relay processing board 300 and the interface board 500 shown in FIG. 1 are only illustrative and may be increased according to other embodiments. The control board 100, the relay processing board 300 and the interface board 500 are connected with one another by a control bus 200. The control board 100 is configured to transmit information to and from the relay processing board 300 and the interface board 500 via the control bus 200.

The relay processing board 300 and the interface board 500 are further connected with each other by an external bus 400. The relay processing board 300 and the interface board 500 are configured to transmit information to and from each other via the external bus 400.

The control board 100 of the network relay apparatus 10 includes a device controller 110 serving to control the respective parts of the network relay apparatus 10. According to this embodiment, the functions of the device controller 110 are implemented by operations of a CPU (Central Processing Unit) based on a computer program. According to another embodiment, the functions of the device controller 110 may be implemented by operations of an ASIC (Application Specific Integrated Circuit) based on its circuit structure.

The device controller 110 performs protocol processing based on a routing protocol, such as RIP (Routing Information Protocol) or OSPF (Open Shortest Path First) as the control process to control the respective parts of the network relay apparatus 10. According to this embodiment, the device controller 110 also adjusts the operating frequencies (frequencies of clock signals) to activate the processing circuits in the relay processing board 300 and the interface board 500, in addition to the protocol processing. The details of the device controller 110 will be described later.

The relay processing board 300 of the network relay apparatus 10 includes an ASIC 310, a CAM (Content Addressable Memory) 360 and a RAM (Random Access Memory) 380. The ASIC 310 of the network relay apparatus 10 is provided as a processing circuit to process data that is to be relayed by the network relay apparatus 10. According to this embodiment, the ASIC 310 is provided as an integrated circuit designed to implement the function of extracting a destination IP address from a packet and the function of determining a forwarding destination port of the packet based on the extracted destination IP address. The CAM 360 and the RAM 380 of the network relay apparatus 10 are provided as additional circuits added to the ASIC 310, i.e., different circuits (external devices) from the ASIC 310. In the perspective from the interface board 500, on the other hand, the ASIC 310 of the relay processing board 300 is regarded as an additional circuit added to the interface board 500, i.e., a different circuit (external device) from the processing circuits in the interface board 500.

The ASIC 310 and the CAM 360 are connected with each other by a memory bus 350. The ASIC 310 is configured to be accessible to the CAM 360 via the memory bus 350. An IP address table 610 is stored in the CAM 360 of the relay processing board 300. The IP address table 610 stores the destination IP address as the routing object in correlation to the storage area of the RAM 380. The IP address table 610 is created according to the protocol processing performed by the device controller 110 of the control board 100.

The ASIC 310 and the RAM 380 are connected with each other by a memory bus 370. The ASIC 310 is configured to be accessible to the RAM 380 via the memory bus 370. A forwarding destination port table 620 is stored in the RAM 380 of the relay processing board 300. In correlation to each destination IP address stored in the IP address table 610, the forwarding destination port table 620 stores information representing the forwarding destination port, which a packet with the destination IP address is to be forwarded to. The forwarding destination port table 620 is created according to the protocol processing performed by the device controller 110 of the control board 100.

The ASIC 310 of the relay processing board 300 includes a forwarding destination determining circuit 320 and a packet processing circuit 340. The forwarding destination determining circuit 320 is provided as a first partial circuit constituting part of the ASIC 310 to implement the function of determining the forwarding destination port of a packet based on the destination IP address. The packet processing circuit 340 is provided as a second partial circuit constituting part of the ASIC 310 to implement the function of extracting the destination IP address from a packet. The partial circuits included in the ASIC 310 are not limited to these two circuits, i.e., the forwarding destination determining circuit 320 and the packet processing circuit 340. According to other embodiments, the ASIC 310 may include three or more partial circuits including one or more additional partial circuits, such as a partial circuit for filtering process, a partial circuit for QoS (Quality of Service) process and a partial circuit for layer 2 forwarding process.

The forwarding destination determining circuit 320 and the packet processing circuit 340 are connected with each other by an internal bus 330. The forwarding destination determining circuit 320 and the packet processing circuit 340 are configured to transmit information to and from each other via the internal bus 330.

The forwarding destination determining circuit 320 of the ASIC 310 includes a buffer circuit 324, an internal bus I/F circuit (internal bus interface circuit) 326 and memory I/F circuits (memory interface circuits) 328 and 329 as partial circuits constituting part of the ASIC 310. The buffer circuit 324 of the forwarding destination determining circuit 320 is provided as a storage element to temporarily store information that is to be processed by the forwarding destination determining circuit 320 (for example, data representing the destination IP address or the data representing the forwarding destination port). The internal bus I/F circuit 326 of the forwarding destination determining circuit 320 is provided as an interface circuit to mediate transmission of information to and from the packet processing circuit 340. The memory I/F circuit 328 of the forwarding destination determining circuit 320 is provided as an interface circuit to mediate transmission of information to and from the CAM 360. The memory I/F circuit 329 of the forwarding destination circuit 320 is provided as an interface circuit to mediate transmission of information to and from the RAM 380.

The packet processing circuit 340 of the ASIC 310 includes a buffer circuit 344, an internal bus I/F circuit 346 and an external bus I/F circuit (external bus interface circuit) 348 as partial circuits constituting part of the ASIC 310. The buffer circuit 344 of the packet processing circuit 340 is provided as a storage element to temporarily store information that is to be processed by the packet processing circuit 340 (for example, packet during processing). The internal bus I/F circuit 346 of the packet processing circuit 340 is provided as an interface circuit to mediate transmission of information to and from the forwarding destination determining circuit 320. The external bus I/F circuit 348 of the packet processing circuit 340 is provided as an interface circuit to mediate transmission of information to and from the interface board 500.

The relay processing board 300 of the network relay apparatus 10 includes a power supply unit 390, clock units 710a and 710b and cutoff clock units 720a, 720b and 720c, in addition to the ASIC 310, the CAM 360 and the RAM 380. The power supply unit 390 of the relay processing board 300 is configured to supply electric power to the respective components of the relay processing board 300.

The clock unit 710a of the relay processing board 300 provides a clock signal having clock pulses of a fixed frequency to the memory I/F circuits 328 and 329. The memory I/F circuits 328 and 329 operate in synchronism with the clock pulses of the clock signal provided by the clock unit 710a. The clock unit 710b of the relay processing board 300 provides a clock signal having clock pulses of a fixed frequency to the external bus I/F circuit 348. The external bus I/F circuit 348 operates in synchronism with the clock pulses of the clock signal provided by the clock unit 710b. The clock signals respectively provided by the clock units 710a and 710b have different frequencies according to this embodiment, but may have the same frequency according to another embodiment.

The cutoff clock unit 720a of the relay processing board 300 provides a clock signal having clock pulses partially eliminated at a rate corresponding to the processing load of the network relay apparatus 10, to the respective components of the forwarding destination determining circuit 320 except the internal bus I/F circuit 326 and the memory I/F circuits 328 and 329. These respective components of the forwarding destination determining circuit 320 operate in synchronism with the clock pulses of the clock signal provided by the cutoff clock unit 720a. The cutoff clock unit 720b of the relay processing board 300 provides a clock signal having clock pulses partially eliminated at a rate corresponding to the processing load of the network relay apparatus 10, to the internal bus I/F circuits 326 and 346. The internal bus I/F circuits 326 and 346 operate in synchronism with the clock pulses of the clock signal provided by the cutoff clock unit 720b. The cutoff clock unit 720c of the relay processing board 300 provides a clock signal having clock pulses partially eliminated at a rate corresponding to the processing load of the network relay apparatus 10, to the respective components of the packet processing circuit 340 except the internal bus I/F circuit 346 and the external bus I/F circuit 348. These respective components of the packet processing circuit 340 operate in synchronism with the clock pulses of the clock signal provided by the cutoff clock unit 720c. The details of the clock signals provided by the respective cutoff clock units 720a, 720b and 720c will be described later.

The interface board 500 of the network relay apparatus 10 includes a sending/receiving process circuit 510 configured to send and receive a packet through physical lines 800 (e.g., coaxial cables or optical fibers). The sending/receiving process circuit 510 also serves as a data receiving unit to receive data that is to be relayed by the network relay apparatus 10, from the lines. The sending/receiving process circuit 510 is provided as a processing circuit to process data that is to be relayed by the network relay apparatus 10. According to this embodiment, the sending/receiving process circuit 510 is structured as an ASIC. In the perspective from the relay processing board 300, the sending/receiving process circuit 510 of the interface board 500 is an additional circuit added to the relay processing board 300, i.e., a different circuit (external device) from the processing circuits of the relay processing board 300.

The sending/receiving process circuit 510 of the interface board 500 includes physical I/F units (physical interface units) 512, a buffer circuit 514 and an external bus I/F circuit 518. Each of the physical I/F units 512 is electrically connected with the physical line 800 and enables a packet to be sent and received through the physical line 800 by the sending/receiving process circuit 510. The buffer circuit 514 of the sending/receiving process circuit 510 is provided as a storage element to temporarily store information that is to be processed by the sending/receiving process circuit 510 (for example, frame or packet). The external bus I/F circuit 518 of the sending/receiving process circuit 510 is provided as an interface circuit to mediate transmission of information to and from the relay processing board 300.

The interface board 500 of the network relay apparatus 10 includes a power supply unit 590, a clock unit 710c and a cutoff clock unit 720d, in addition to the sending/receiving process circuit 510. The power supply unit 590 of the interface board 500 is configured to supply electric power to the respective components of the interface board 500.

The clock unit 710c of the interface board 500 provides a clock signal having clock pulses of a fixed frequency to the external bus I/F circuit 518. The external bus I/F circuit 518 operates in synchronism with the clock pulses of the clock signal provided by the clock unit 710c. According to this embodiment, the frequency of the clock signal provided by the clock unit 710c of the interface board 500 is identical with the frequency of the clock signal provided by the clock unit 710b of the relay processing board 300. These clock signals have clock pulses that are synchronous with each other.

The cutoff clock unit 720d of the interface board 500 provides a clock signal having clock pulses partially eliminated at a rate corresponding to the processing load of the network relay apparatus 10, to the respective components of the sending/receiving process circuit 510 except the external bus I/F circuit 518. These respective components of the sending/receiving process circuit 510 operate in synchronism with the clock pulses of the clock signal provided by the cutoff clock unit 720d. The details of the clock signal provided by the cutoff clock unit 720d will be described later.

In the description of the embodiment, the clock units 710a and 710b of the relay processing board 300 and the clock unit 710c of the interface board 500 are collectively represented by the numerical symbol "710" and called clock units 710. Similarly, in the description of the embodiment, the cutoff clock units 720a, 720b and 720c of the relay processing board 300 and the cutoff clock unit 720d of the interface board 500 are collectively represented by the numerical symbol "720" and called cutoff clock units 720. Each of the cutoff clock units 720 works as a frequency regulator to adjust the frequency of the clock signal by cutting off the supply of the clock pulses of the clock signal to the processing circuit.

Figure 2:
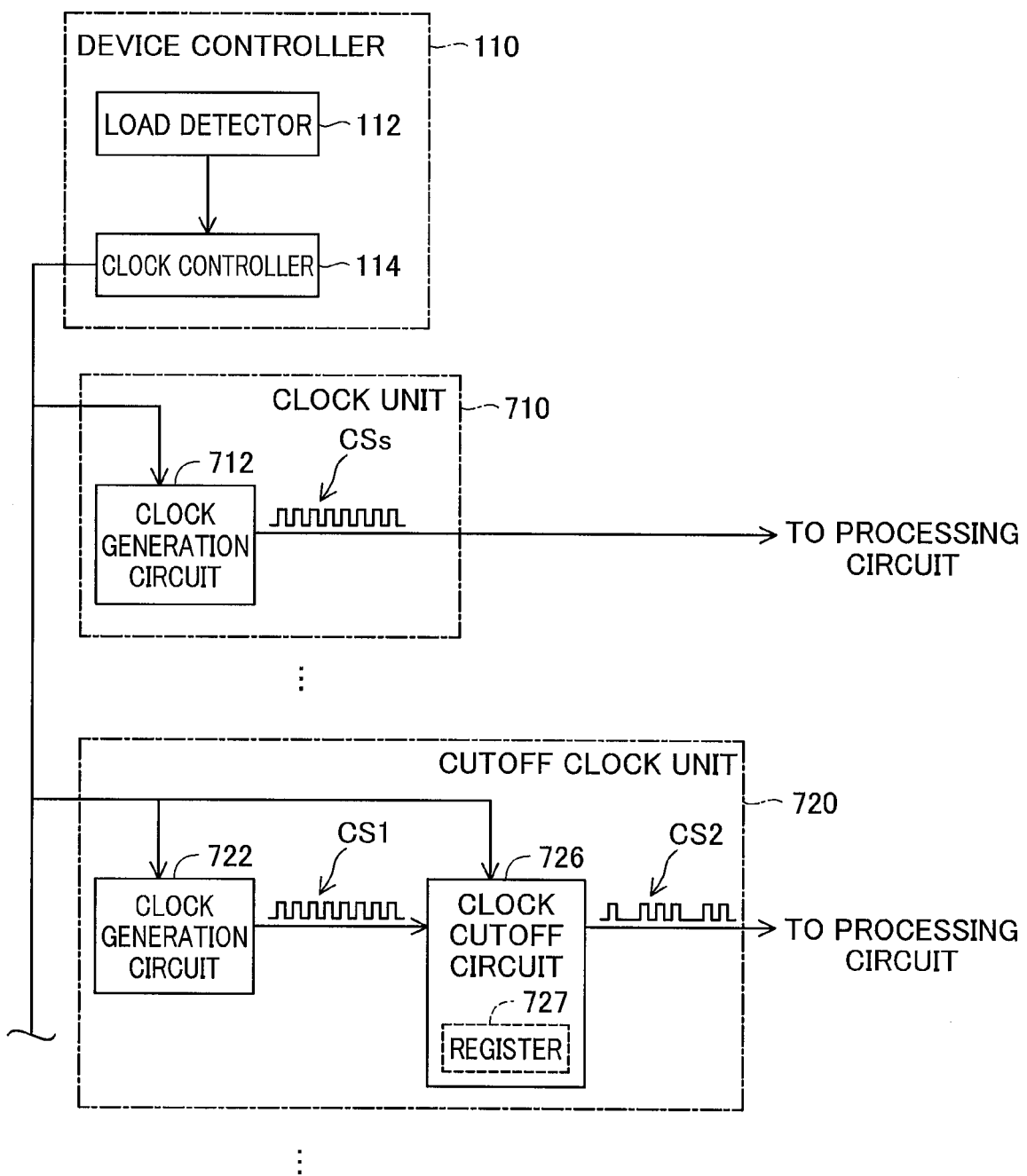
FIG. 2 illustrates the detailed structure of a device controller, a clock unit and a cutoff clock unit.

FIG. 2 illustrates the detailed structure of the device controller 110, the clock unit 710 and the cutoff clock unit 720.

The device controller 110 of the control board 100 includes a load detector 112 and a clock controller 114. The load detector 112 of the device controller 110 detects the processing load of the network relay apparatus 10. The clock controller 114 of the device controller 110 controls the supply of clock signals to the respective processing circuits by the clock units 710 and the cutoff clock units 720. More specifically, the clock controller 114 controls the cutoff clock units 720, based on the processing load detected by the load detector 112.

Each of the clock units 710 included in the relay processing board 300 or in the interface board 500 has a clock generation circuit 712. The clock generation circuit 712 of the clock unit 710 generates a clock signal CSs having periodical clock pulses, in response to an instruction from the clock controller 114 of the device controller 110. The clock signal CSs generated by the clock generation circuit 712 is provided to each processing circuit. The clock generation circuit 712 includes at least one of an oscillator, a multiplier and a frequency divider and may be structured to share at least part of the oscillator, the multiplier and the frequency divider with another clock unit 710 or another cutoff clock unit 720.

Each of the cutoff clock units 720 included in the relay processing board 300 or in the interface board 500 includes a clock generation circuit 722 and a clock cutoff circuit 726. The clock generation circuit 722 of the cutoff clock unit 720 generates a clock signal CS1 having periodical clock pulses, in response to an instruction from the clock controller 114 of the device controller 110. The clock generation circuit 722 includes at least one of an oscillator, a multiplier and a frequency divider and may be structured to share at least part of the oscillator, the multiplier and the frequency divider with another clock unit 710 or another cutoff clock unit 720.

The clock cutoff circuit 726 of the cutoff clock unit 720 cuts off the supply of the clock pulses of the clock signal CS1 (gating) from the clock generation circuit 722 to each processing circuit, in response to an instruction from the clock controller 114 of the device controller 110. The clock cutoff circuit 726 accordingly generates a clock signal CS2 having clock pulses partially eliminated from those of the clock signal CS1 at a rate specified by the instruction from the clock controller 114 of the device controller 110. The clock signal CS2 generated by the clock cutoff circuit 726 is provided to each processing circuit.

According to this embodiment, the clock cutoff circuit 726 has a register 727. The clock controller 114 of the device controller 110 stores a register value into the register 727 via the control bus 200. The clock cutoff circuit 726 generates the clock signal CS2 having clock pulses partially eliminated from those of the clock signal CS1 at a rate corresponding to the register value stored in the register 727.

According to this embodiment, the clock generation circuit 722 of the cutoff clock unit 720a is provided as a first clock generation circuit to generate a first clock signal having periodical first clock pulses. The clock cutoff circuit 726 of the cutoff clock unit 720a is provided as a first clock cutoff circuit to cut off the supply of the first clock pulses to the forwarding destination determining circuit 320 serving as the first partial circuit. According to this embodiment, the clock generation circuit 722 of the cutoff clock unit 720c is provided as a second clock generation circuit to generate a second clock signal having periodical second clock pulses. The clock cutoff circuit 726 of the cutoff clock unit 720c is provided as a second clock cutoff circuit to cut off the supply of the second clock pulses to the packet processing circuit 340 serving as the second partial circuit.

Figure 3:
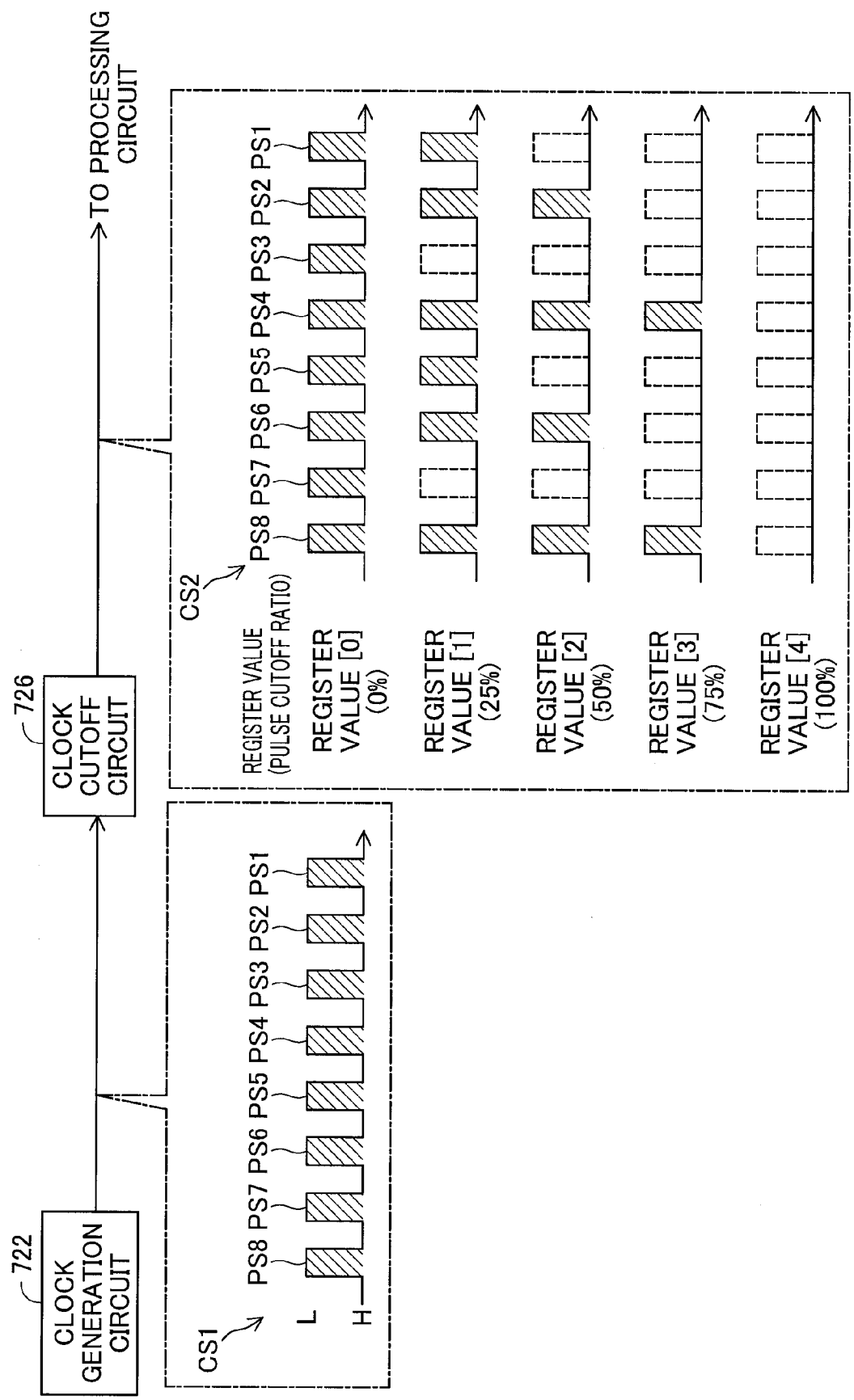
FIG. 3 illustrates generation of clock signals by the cutoff clock unit.

FIG. 3 illustrates generation of clock signals CS2 by the cutoff clock unit 720. In the illustrated example of FIG. 3, the clock signal CS2 is generated from the clock signal CS1 having eight periodical clock pulses PS1, PS2, PS3, . . . , PS8. In the illustrated example of FIG. 3, the clock signal CS1 has the eight periodical clock pulses PS1 to PS8 appearing repeatedly in the ascending sequence starting from the clock pulse PS1.

According to this embodiment, the pulse cutoff ratio that represents a ratio of cutting off the clock pulses of the clock signal CS1 by the clock cutoff circuit 726 is set in five different levels, i.e., "0%", "25%", "50%, "75% and "100%". According to another embodiment, the pulse cutoff ratio may be set in two different levels of "0%" and "100%", in three different levels, in four different levels or in six or a greater number of levels.

When the pulse cutoff ratio is set to "0%", the register value "0" is stored in the register 727 of the clock cutoff circuit 726. In this state, the clock cutoff circuit 726 allows passage of all the eight clock pulses PS1 to PS8 of the clock signal CS1. The clock signal CS2 of this state is accordingly identical with the clock signal CS1.

When the pulse cutoff ratio is set to "25%", the register value "1" is stored in the register 727 of the clock cutoff circuit 726. In this state, the clock cutoff circuit 726 allows passage of 75% of the clock pulses in number out of the clock pulses of the clock signal CS1, while cutting off 25% of the clock pulses in number. In the illustrated example of FIG. 3, the clock cutoff circuit 726 cuts off two clock pulses PS3 and PS7 out of the eight clock pulses PS1 to PS8 of the clock signal CS1. The clock signal CS2 is accordingly generated by eliminating two clock pulses PS3 and PS7 at equal intervals from the clock signal CS1. As a result, the processing circuit that receives the clock signal CS2 of this state has the lower operating frequency than the operating frequency at the pulse cutoff ratio of "0%".

When the pulse cutoff ratio is set to "50%, the register value "2" is stored in the register 727 of the clock cutoff circuit 726. In this state, the clock cutoff circuit 726 allows passage of 50% of the clock pulses in number out of the clock pulses of the clock signal CS1, while cutting off 50% of the clock pulses in number. In the illustrated example of FIG. 3, the clock cutoff circuit 726 cuts off four clock pulses PS1, PS3, PS5 and PS7 out of the eight clock pulses PS1 to PS8 of the clock signal CS1. The clock signal CS2 is accordingly generated by eliminating four clock pulses PS1, PS3, PS5 and PS7 at equal intervals from the clock signal CS1. As a result, the processing circuit that receives the clock signal CS2 of this state has the lower operating frequency than the operating frequency at the pulse cutoff ratio of "25%".

When the pulse cutoff ratio is set to "75%", the register value "3" is stored in the register 727 of the clock cutoff circuit 726. In this state, the clock cutoff circuit 726 allows passage of 25% of the clock pulses in number out of the clock pulses of the clock signal CS1, while cutting off 75% of the clock pulses in number. In the illustrated example of FIG. 3, the clock cutoff circuit 726 cuts off six clock pulses PS1, PS2, PS3, PS5, PS6 and PS7 out of the eight clock pulses PS1 to PS8 of the clock signal CS1. The clock signal CS2 is accordingly generated by eliminating six cock pulses PS1, PS2, PS3, PS5, PS6 and PS7 at equal intervals from the clock signal CS1. As a result, the processing circuit that receives the clock signal CS2 of this state has the lower operating frequency than the operation frequency at the pulse cutoff ratio of "50%".

When the pulse cutoff ratio is set to "100%", the register value "4" is stored in the register 727 of the clock cutoff circuit 726. In this state, the clock cutoff circuit 726 cuts off all the eight clock pulses PS1 to PS8 of the clock signal CS1. The clock signal CS2 is accordingly generated to have no clock pulse. As a result, the processing circuit that receives the clock signal CS2 of this state stops its operation.

Figure 4:
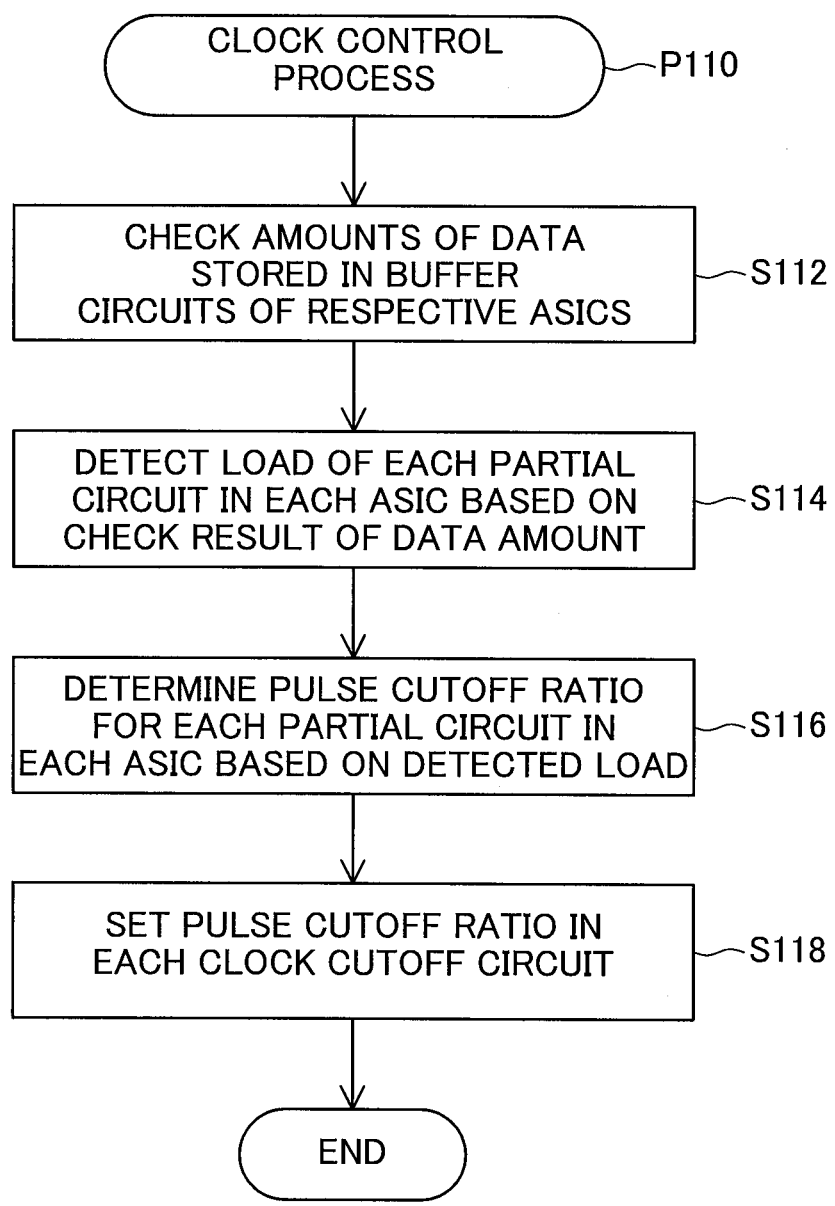
FIG. 4 is a flowchart showing clock control process performed by the device controller.

FIG. 4 is a flowchart showing clock control process P110 performed by the device controller 110. The clock control process P110 is performed to control the clock signal CS2 provided by the cutoff clock unit 720. According to this embodiment, the device controller 110 performs the clock control process P110 at regular intervals. According to another embodiment, the device controller 110 may perform the clock control process P110 based on a specified condition.

On the start of the clock control process P110, the device controller 110 first checks the amounts of data stored in the buffer circuits of the respective ASICs in the relay processing board 300 and the interface board 500 (step S112). More specifically, the device controller 110 checks the amounts of data stored in the buffer circuits 324 and 344 of the ASIC 310 in the relay processing board 300 and the amount of data stored in the buffer circuit 514 of the sending/receiving process circuit 510 in the interface board 500 via the control bus 200.

After checking the amounts of data stored in the respective buffer circuits (step S112), the device controller 110 operates as its load detector 112 to detect the load of each partial circuit with respect to each of the ASICs in the relay processing board 300 and the interface board 500, based on the check result of data amount (step S114). More specifically, the device controller 110 detects the load of the forwarding destination determining circuit 320 based on the amount of data in the buffer circuit 324, while detecting the load of the packet processing circuit 340 based on the amount of data in the buffer circuit 344. According to the embodiment, the device controller 110 detects the load of the internal bus I/F circuits 326 and 346, based on the mean value of the amounts of data in the respective buffer circuits 324 and 344. The device controller 110 also detects the load of the sending/receiving process circuit 510 provided as the ASIC, based on the amount of data in the buffer circuit 514.

According to this embodiment, the device controller 110 detects the ratio of the data amount to the storage capacity in the buffer circuit, as the load. For example, when the ratio of the data amount to the storage capacity exceeds 75%, the device controller 110 detects that the load is "100%". When the ratio of the data amount to the storage capacity exceeds 50% but is equal to or less than 75%, the device controller 110 detects that the load is "75%". When the ratio of the data amount to the storage capacity exceeds 25% but is equal to or less than 50%, the device controller 110 detects that the load is "50%". When the ratio of the data amount to the storage capacity exceeds 0% but is equal to or less than 25%, the device controller 110 detects that the load is "25%". When the ratio of the data amount to the storage capacity is equal to 0%, the device controller 110 detects that the load is "0%".

According to the embodiment, even at the ratio of the data amount to the storage capacity equal to 0%, when an increase of the load in a partial circuit is expected based on the progress of processing in a pre-stage prior to the processing by the partial circuit, the device controller 110 detects that the load is "25%". This prevents the overall processing in the network relay apparatus 10 from being retarded due to the unnecessarily prolonged inactive state in part of the processing circuits.

After detecting the load of each partial circuit (step S114), the device controller 110 determines the pulse cutoff ratio for each of the partial circuits in the respective ASICs of the relay processing board 300 and the interface board 500, based on the detected load (step S116). According to the embodiment, the device controller 110 determines that the pulse cutoff ratio is "0%" corresponding to the detected load of "100%". The device controller 110 determines that the pulse cutoff ratio is "25%" corresponding to the detected load of "75%". The device controller 110 determines that the pulse cutoff ratio is "50%" corresponding to the detected load of "50%". The device controller 110 determines that the pulse cutoff ratio is "75%" corresponding to the detected load of "25%". The device controller 110 determines that the pulse cutoff ratio is "100%" corresponding to the detected load of "0%".

After determining the pulse cutoff ratio for each partial circuit (step S116), the device controller 110 sets the pulse cutoff ratio in each of the clock cutoff circuits 726 of the relay processing board 300 and the interface board 500 (step S118). More specifically, the device controller 110 sets the pulse cutoff ratio for the forwarding destination determining circuit 320 in the clock cutoff circuit 726 of the cutoff clock unit 720a, while setting the pulse cutoff ratio for the packet processing circuit 340 in the clock cutoff circuit 726 of the cutoff clock unit 720c. The device controller 110 also sets the pulse cutoff ratio for the internal bus I/F circuits 326 and 346 in the clock cutoff circuit 726 of the cutoff clock unit 720b. Additionally, the device controller 110 sets the pulse cutoff ratio for the sending/receiving process circuit 510 in the clock cutoff circuit 726 of the cutoff clock unit 720d.

According to the embodiment, in order to set the pulse cutoff ratio to "0%", the device controller 110 stores the register value "0" in the register 727 of the clock cutoff circuit 726 via the control bus 200. Similarly, the device controller 100 stores the register value "1" to set the pulse cutoff ratio to "25%", stores the register value "2" to set the pulse cutoff ratio to "50%", stores the register value "3" to set the pulse cutoff ratio to "75%" and stores the register value "4" to set the pulse cutoff ratio to "100%" in the register 727 of the clock cutoff circuit 726.

After setting the pulse cutoff ratio in each clock cutoff circuit 726 (step S118), the device controller 110 terminates the clock control process P110.

As described above, the network relay apparatus 10 of the first embodiment increases the pulse cutoff ratio of partially eliminating the clock pulses that are to be supplied to each processing circuit (for example, forwarding destination determining circuit 320, packet processing circuit 340 or sending/receiving process circuit 510) with a decrease in load of the processing circuit. The increasing pulse cutoff ratio decreases the operating frequency of the processing circuit and thereby reduces power consumption of the processing circuit. This accordingly achieves power-saving of the network relay apparatus 10 according to the loads of the respective processing circuits.

The operating frequency of each processing circuit is adjusted by cutting off the supply of the clock pulses to the processing circuit by the clock cutoff circuit 726. Compared with adjustment of the operating frequency using at least one of an oscillator, a multiplier and a frequency divider, such adjustment of the operating frequency advantageously shortens the time required for changeover of the operating frequency and prevents potential packet loss accompanied with adjustment of the operating frequency.

The clock cutoff circuits 726 of the cutoff clock units 720a and 720c are controlled according to the respective loads of the forwarding destination determining circuit 320 and the packet processing circuit 340 as the first and the second partial circuits in the ASIC 310 of the relay processing board 300. The operating frequencies of the forwarding destination determining circuit 320 and the packet processing circuit 340 can thus be adjustable according to the respective loads of the forwarding destination determining circuit 320 and the packet processing circuit 340.

The loads are detected, based on the amounts of data stored in the buffer circuits 324, 344 and 514. The operating frequencies of the respective processing circuits (for example, forwarding destination determining circuit 320, packet processing circuit 340 and sending/receiving process circuit 510) can thus be adjustable, based on the amounts of data stored in the buffer circuits 324, 344 and 514.

The frequency of the clock signal CSs that is supplied to drive each of the interface circuits connected with an external device, i.e., the memory I/F circuits 328 and 329 and the external bus I/F circuits 348 and 518, remains constant before and after the cutoff of clock pulses by the clock cutoff circuit 726 of the cutoff clock unit 720. This enables the operating frequency of each of the processing circuits (for example, forwarding destination determining circuit 320, packet processing circuit 340 and sending/receiving process circuit 510) to be adjusted without controlling transmission of signals between each of the interface circuits, i.e., the memory I/F circuits 328 and 329 and the external bus I/F circuits 348 and 518, and the external device.

Modification of First Embodiment

Figure 11:
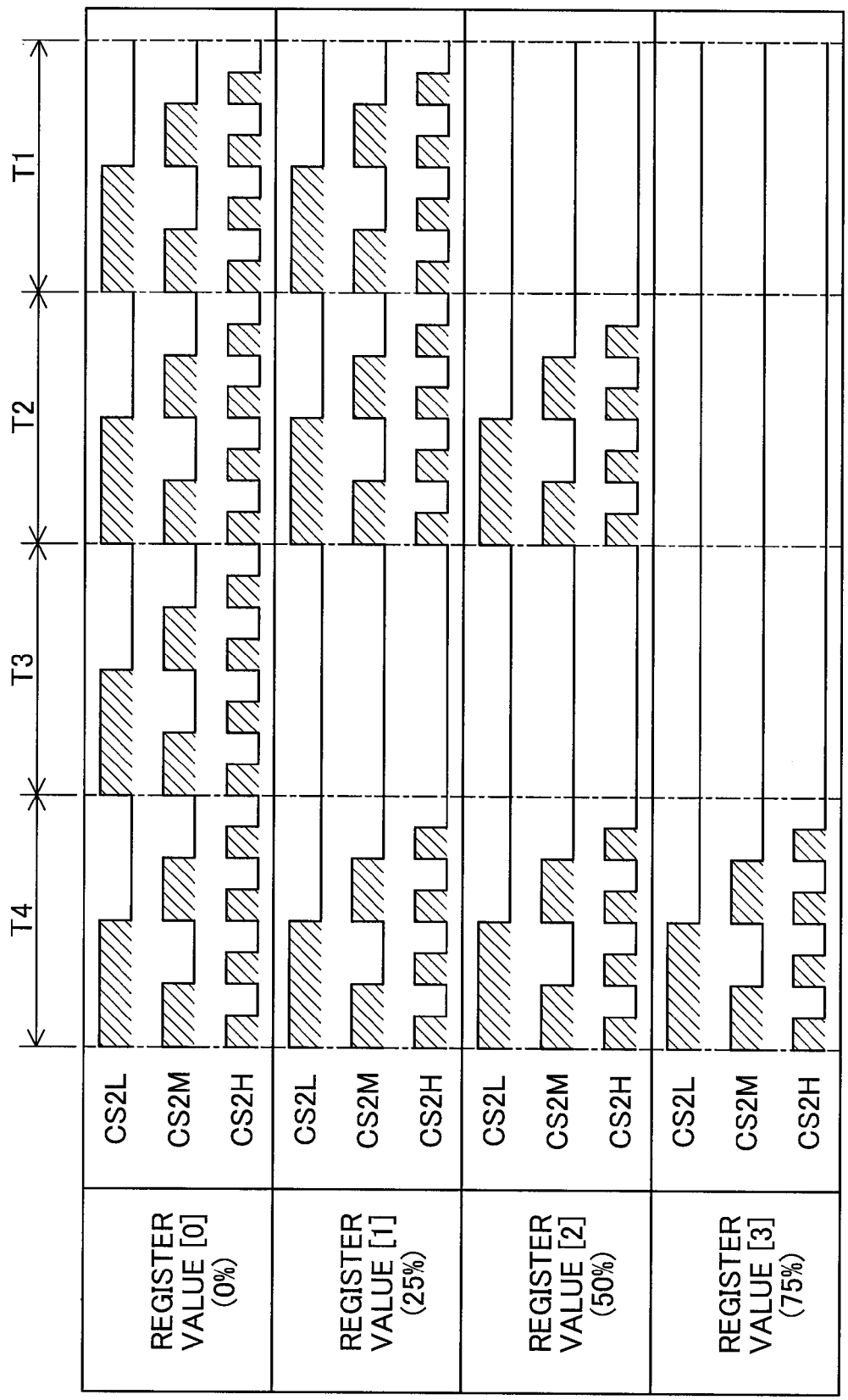
FIG. 11 illustrates generation of clock signals by the cutoff clock unit according to one modification of the first embodiment.

FIG. 11 illustrates generation of clock signals by the cutoff clock unit 720 according to one modification of the first embodiment. The configuration of the modification shown in FIG. 11 is substantially similar to the configuration of the first embodiment, except that one single cutoff clock unit 720 provides a plurality of clock signals CS2 generated from a plurality of clock signals CS1 respectively having different frequencies to one single partial circuit (for example, forwarding destination determining circuit 320).

In the illustrated example of FIG. 11, the single cutoff clock unit 720 provides three different clock signals CS2L, CS2M and CS2H to one single partial circuit. The clock signal CS2L is the clock signal CS2 provided to a circuit portion of the partial circuit operating at a relatively low speed. The clock signal CS2M is the clock signal CS2 provided to a circuit portion of the partial circuit operating at an intermediate speed. The clock signal CS2H is the clock signal CS2 provided to a circuit portion of the partial circuit operating at a relatively high speed. In the illustrated example of FIG. 11, when the cycle of the clock signal CS2L is equal to "N", the cycle of the clock signal CS2M is "N/2" and the cycle of the clock signal CS2H is "N/4". FIG. 11 illustrates the clock signals CS2L, CS2M and CS2H at the pulse cutoff ratios of "0%", "25%", "50%" and "75%".

When the pulse cutoff ratio is set to "0%" according to the load of a partial circuit that receives the clock signals CS2L, CS2M and CS2H, the register value "0" is stored in the register 727 of the clock cutoff circuit 726 in the cutoff clock unit 720. In this state, the clock cutoff circuit 726 allows passage of all the clock pulses as the source of the respective clock signals CS2L, CS2M and CS2H.

When the pulse cutoff ratio is set to "25%", the register value "1" is stored in the register 727 of the clock cutoff circuit 726 in the cutoff clock unit 720. In this state, the clock cutoff circuit 726 synchronously cuts off the clock pulses as the source of the respective clock signals CS2L, CS2M and CS2H during a period T3 corresponding to one cycle of the clock signal CS2L among periods T1, T2, T3 and T4 corresponding to four cycles of the clock signal CS2L.

When the pulse cutoff ratio is set to "50%", the register value "2" is stored in the register 727 of the clock cutoff circuit 726 in the cutoff clock unit 720. In this state, the clock cutoff circuit 726 synchronously cuts off the clock pulses as the source of the respective clock signals CS2L, CS2M and CS2H during periods T1 and T3 corresponding to two cycles of the clock signal CS2L among the periods T1, T2, T3 and T4 corresponding to the four cycles of the clock signal CS2L.

When the pulse cutoff ratio is set to "75%", the register value "3" is stored in the register 727 of the clock cutoff circuit 726 in the cutoff clock unit 720. In this state, the clock cutoff circuit 726 synchronously cuts off the clock pulses as the source of the respective clock signals CS2L, CS2M and CS2H during periods T1, T2 and T3 corresponding to three cycles of the clock signal CS2L among the periods T1, T2, T3 and T4 corresponding to the four cycles of the clock signal CS2L.

When the pulse cutoff ratio is set to "100%", the register value "4" is stored in the register 727 of the clock cutoff circuit 726 in the cutoff clock unit 720. In this state, the clock cutoff circuit 726 cuts off all the clock pulses as the source of the respective clock signals CS2L, CS2M and CS2H.

Like the configuration of the first embodiment, the configuration of the modification shown in FIG. 11 achieves power-saving of the network relay apparatus 10 according to the loads of the respective processing circuits. This configuration also facilitates control of the plurality of clock signals CS2L, CS2M and CS2H respectively having different frequencies.

B. Second Embodiment

A network relay apparatus 10 according to a second embodiment has the similar configuration to that of the network relay apparatus 10 of the first embodiment, except a different method adopted for generation of the clock signal CS2 in the relay processing board 300.

Figure 5:
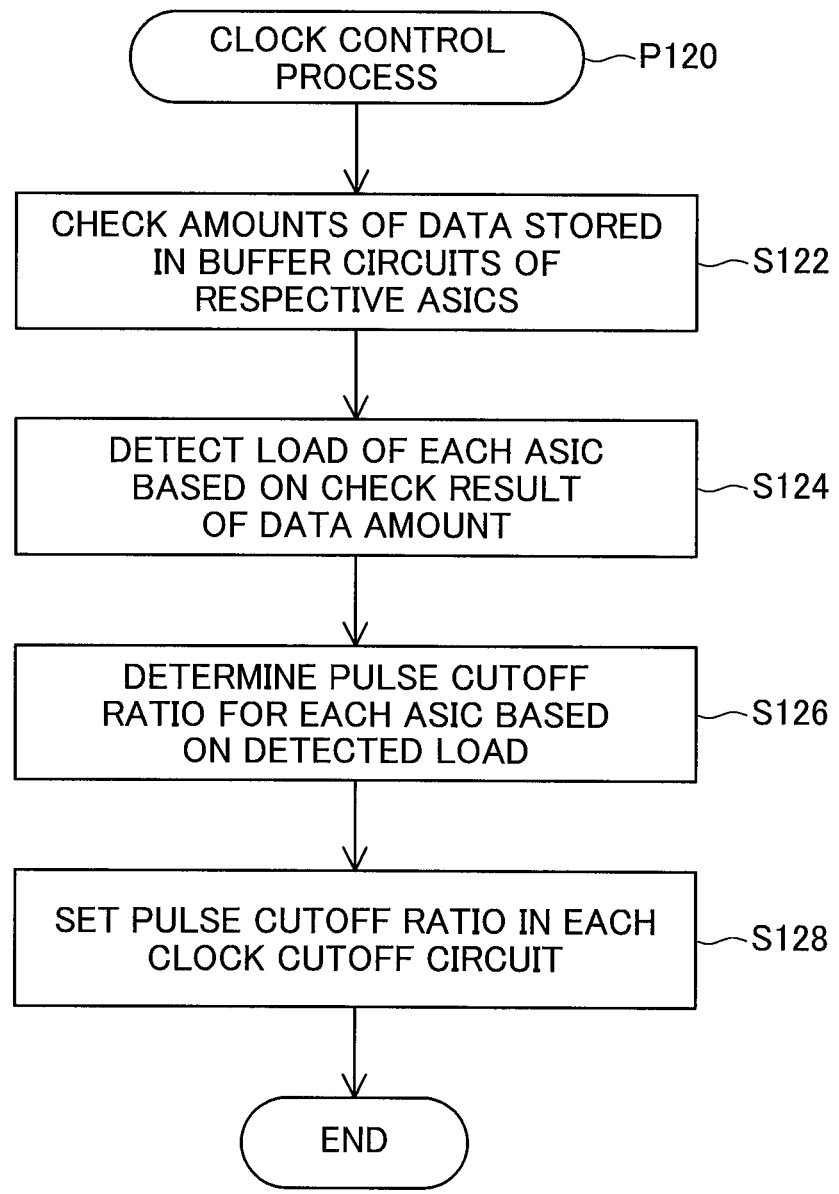
FIG. 5 is a flowchart showing clock control process according to a second embodiment.

FIG. 5 is a flowchart showing clock control process P120 according to the second embodiment. The clock control process P120 is performed to control the clock signal CS2 provided by the cutoff clock unit 720. According to this embodiment, the device controller 110 performs the clock control process P120 at regular intervals. According to another embodiment, the device controller 110 may perform the clock control process P120 based on a specified condition.

On the start of the clock control process P120, the device controller 110 first checks the amounts of data stored in the buffer circuits of the respective ASICs in the relay processing board 300 and the interface board 500 (step S122). More specifically, the device controller 110 checks the amounts of data stored in the buffer circuits 324 and 344 of the ASIC 310 in the relay processing board 300 and the amount of data stored in the buffer circuit 514 of the sending/receiving process circuit 510 in the interface board 500 via the control bus 200.

After checking the amounts of data stored in the respective buffer circuits (step S122), the device controller 110 operates as its load detector 112 to detect the load of each of the ASICs in the relay processing board 300 and the interface board 500, based on the check result of data amount (step S124). More specifically, the device controller 110 detects the load of the ASIC 310, based on the mean value of the amounts of data in the respective buffer circuits 324 and 344. The device controller 110 also detects the load of the sending/receiving process circuit 510 provided as the ASIC, based on the amount of data in the buffer circuit 514. According to the second embodiment, like the first embodiment, the device controller 110 detects the ratio of the data amount to the storage capacity in the buffer circuit, as the load.

After detecting the load of each ASIC (step S124), the device controller 110 determines the pulse cutoff ratio for each of the ASICs in the relay processing board 300 and the interface board 500, based on the detected load (step S126). According to the second embodiment, like the first embodiment, the device controller 110 determines the pulse cutoff ratio corresponding to the detected load.

After determining the pulse cutoff ratio for each ASIC (step S126), the device controller 110 sets the pulse cutoff ratio in each of the clock cutoff circuits 726 of the relay processing board 300 and the interface board 500 (step S128). More specifically, the device controller 110 sets the pulse cutoff ratio for the ASIC 310 in each of the clock cutoff circuits 726 of the cutoff clock units 720a, 720b and 720c, while setting the pulse cutoff ratio for the sending/receiving process circuit 510 in the clock cutoff circuit 726 of the cutoff clock unit 720d. According to the second embodiment, like the first embodiment, the device controller 110 stores the register value in the register 727 of the clock cutoff circuit 726 via the control bus 200.

After setting the pulse cutoff ratio in each clock cutoff circuit 726 (step S128), the device controller 110 terminates the clock control process P120.

Figure 6:
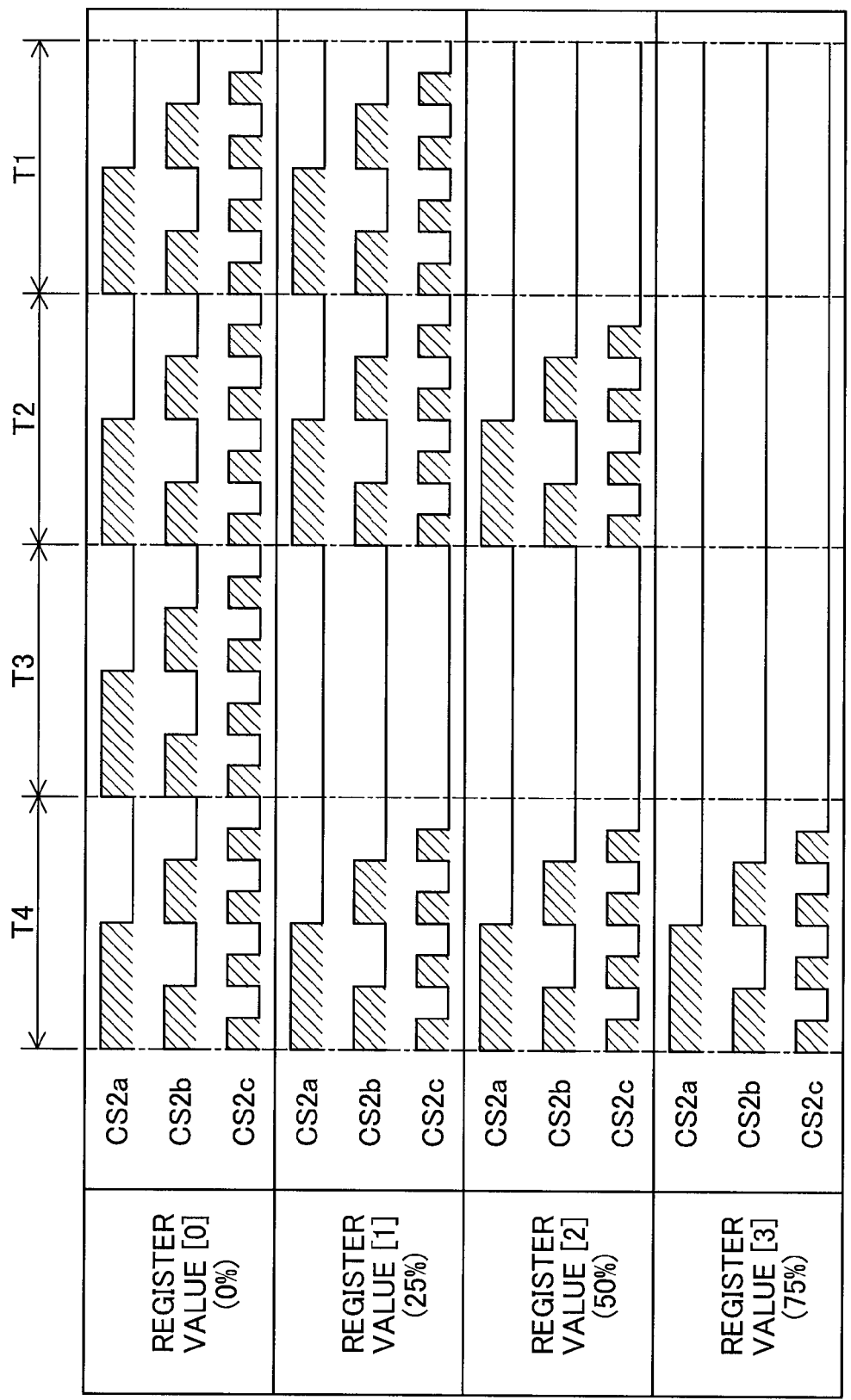
FIG. 6 illustrates generation of clock signals by the cutoff clock unit according to the second embodiment.

FIG. 6 illustrates generation of clock signals CS2 by the cutoff clock unit 720 according to the second embodiment. More specifically, FIG. 6 illustrates clock signals CS2a, CS2b and CS2c at the pulse cutoff ratios of "0%, "25%", "50% and "75%". The clock signal CS2a is the clock signal CS2 provided from the cutoff clock unit 720a to the forwarding destination determining circuit 320. The clock signal CS2b is the clock signal CS2 provided from the cutoff clock unit 720b to the internal bus I/F circuits 326 and 346. The clock signal CS2c is the clock signal CS2 provided from the cutoff clock unit 720c to the packet processing circuit 340. According to this embodiment, when the cycle of the clock signal CS2a is equal to "N", the cycle of the clock signal CS2b is "N/2" and the cycle of the clock signal CS2c is "N/4".

When the pulse cutoff ratio is set to "0%, the register value "0" is stored in the register 727 of each of the clock cutoff circuits 726 in the respective cutoff clock units 720a, 720b and 720c. In this state, the respective clock cutoff circuits 726 allow passage of all the clock pulses of the clock signal CS1.

When the pulse cutoff ratio is set to "25%", the register value "1" is stored in the register 727 of each of the clock cutoff circuits 726 in the respective cutoff clock units 720a, 720b and 720c. In this state, the respective clock cutoff circuits 726 are synchronized with each other to cut off the clock pulses during a period T3 corresponding to one cycle of the clock signal CS2a among periods T1, T2, T3 and T4 corresponding to four cycles of the clock signal CS2a.

When the pulse cutoff ratio is set to "50%", the register value "2" is stored in the register 727 of each of the clock cutoff circuits 726 in the respective cutoff clock units 720a, 720b and 720c. In this state, the respective clock cutoff circuits 726 are synchronized with each other to cut off the clock pulses during periods T1 and T3 corresponding to two cycles of the clock signal CS2a among the periods T1, T2, T3 and T4 corresponding to the four cycles of the clock signal CS2a.

When the pulse cutoff ratio is set to "75%", the register value "3" is stored in the register 727 of each of the clock cutoff circuits 726 in the respective cutoff clock units 720a, 720b and 720c. In this state, the respective clock cutoff circuits 726 are synchronized with each other to cut off the clock pulses during periods T1, T2 and T3 corresponding to three cycles of the clock signal CS2a among the periods T1, T2, T3 and T4 corresponding to the four cycles of the clock signal CS2a.

When the pulse cutoff ratio is set to "100%", the register value "4" is stored in the register 727 of each of the clock cutoff circuits 726 in the respective cutoff clock units 720a, 720b and 720c. In this state, the respective clock cutoff circuits 726 cut off all the clock pulses of the clock signal CS1

As described above, like the first embodiment, the configuration of the second embodiment achieves power-saving of the network relay apparatus 10 according to the loads of the respective processing circuits (for example, forwarding destination determining circuit 320, packet processing circuit 340 and sending/receiving process circuit 510).

The configuration of the second embodiment synchronously cuts off the supply of the first clock pulses and the supply of the second clock pulses to the forwarding destination determining circuit 320 and to the packet processing circuit 340 provided as the first and the second partial circuits that respectively operate at different operating frequencies. This facilitates control of transmission of signals between the forwarding destination determining circuit 320 and the packet processing circuit 340 before and after the cutoff, compared with separately cutting off the supply of the first clock pulses and the supply of the second clock pulses.

C. Third Embodiment

A network relay apparatus 10 according to a third embodiment has the similar configuration to that of the network relay apparatus 10 of the second embodiment, except a different technique adopted for detection of the load.

Figure 7:
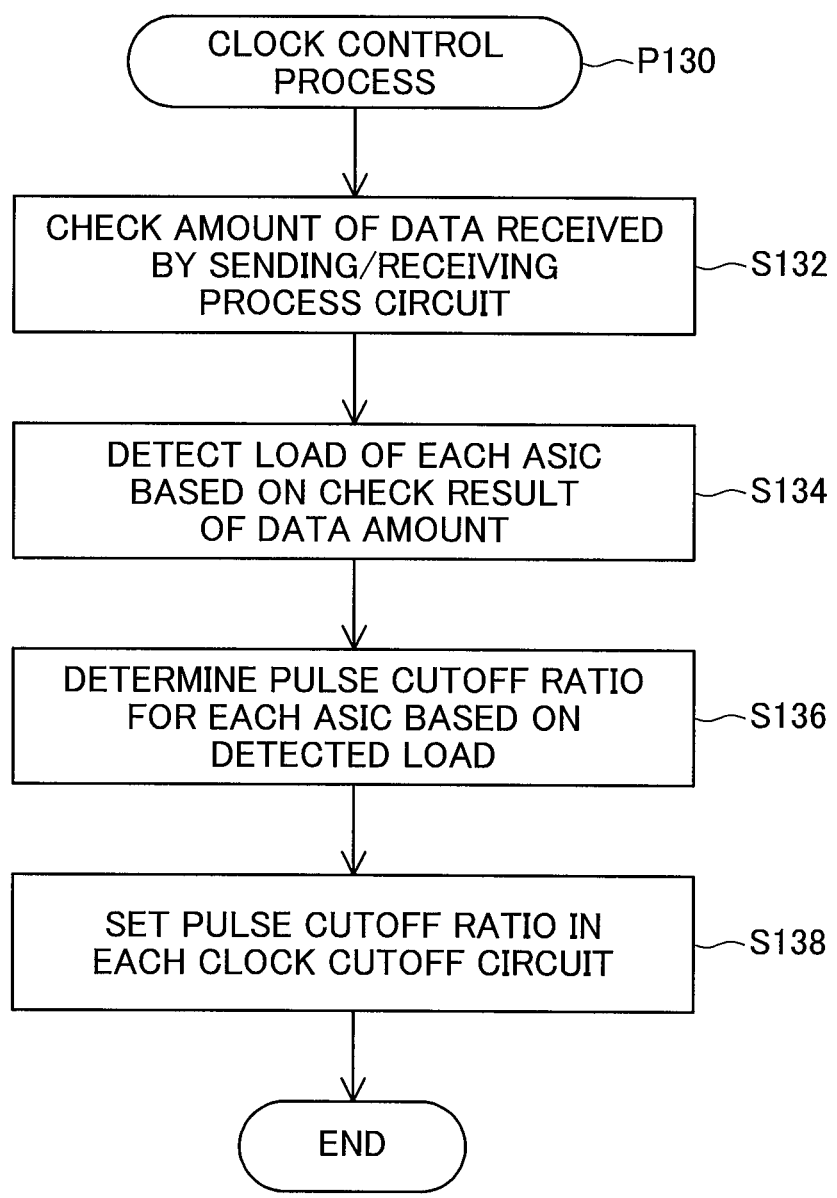
FIG. 7 is a flowchart showing clock control process according to a third embodiment.

FIG. 7 is a flowchart showing clock control process P130 according to the third embodiment. The clock control process P130 is performed to control the clock signal CS2 provided by the cutoff clock unit 720. According to this embodiment, the device controller 110 performs the clock control process P130 at regular intervals. According to another embodiment, the device controller 110 may perform the clock control process P130 based on a specified condition.

On the start of the clock control process P130, the device controller 110 checks the amount of data received by the sending/receiving process circuit 510 (step S132). More specifically, the device controller 110 checks the data amount of a frame or a packet that is received by the sending/receiving process circuit 510 via the physical I/F unit 512 and is stored in the buffer circuit 514, via the control bus 200.

After checking the amount of data received by the sending/receiving process circuit 510 (step S132), the device controller 110 operates as its load detector 112 to detect the load of each of the ASICs in the relay processing board 300 and the interface board 500, based on the check result of data amount (step S134). More specifically, information representing the relationship between the amount of data received by the sending/receiving process circuit 510 and the load of each ASIC is set in advance in the device controller 110. The device controller 110 refers to this information and detects the load of each of the ASICs in the relay processing board 300 and the interface board 500.

After detecting the load of each ASIC (step S134), like the second embodiment, the device controller 110 determines the pulse cutoff ratio for each of the ASICs in the relay processing board 300 and the interface board 500, based on the detected load (step S136).

After determining the pulse cutoff ratio for each ASIC (step S136), the device controller 110 sets the pulse cutoff ratio in each of the clock cutoff circuits 726 of the relay processing board 300 and the interface board 500 (step S138) and then terminates the clock control process P130.

As described above, like the second embodiment, the configuration of the third embodiment achieves power-saving of the network relay apparatus 10 according to the loads of the respective processing circuits (for example, forwarding destination determining circuit 320, packet processing circuit 340 and sending/receiving process circuit 510).

The network relay apparatus 10 of the third embodiment detects the load based on the amount of data received by the sending/receiving process circuit 510. The operating frequencies of the respective processing circuits (for example, forwarding destination determining circuit 320, packet processing circuit 340 and sending/receiving process circuit 510) can thus be adjustable, based on the amount of data received by the sending/receiving process circuit 510.

D. Fourth Embodiment

A network relay apparatus 10 according to a fourth embodiment has the similar configuration to that of the network relay apparatus of the second embodiment, except a different technique adopted for detection of the load.

Figure 8:
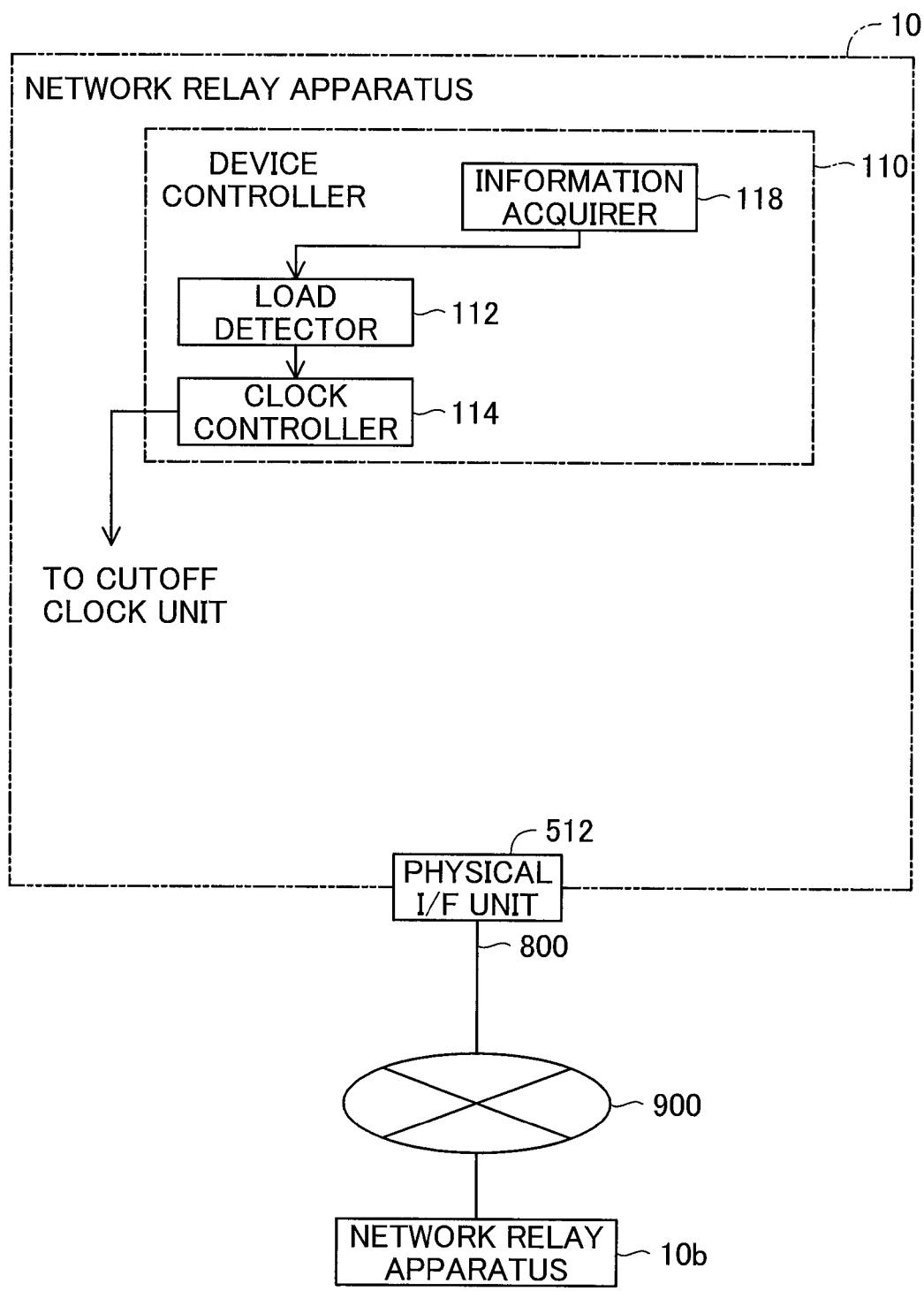
FIG. 8 illustrates the configuration of a network relay apparatus according to a fourth embodiment.

FIG. 8 illustrates the configuration of the network relay apparatus of the fourth embodiment. The network relay apparatus 10 of the fourth embodiment has the similar configuration to that of the first embodiment, except the structure of a device controller 110. The device controller 110 of the fourth embodiment has the similar structure to that of the first embodiment, except addition of an information acquirer 118. The information acquirer 118 of the device controller 110 obtains information, which represents the amount of data transmitted in a computer network 900, from another network relay apparatus 10b that cooperates with the network relay apparatus 10 to construct the computer network 900.

Figure 9:
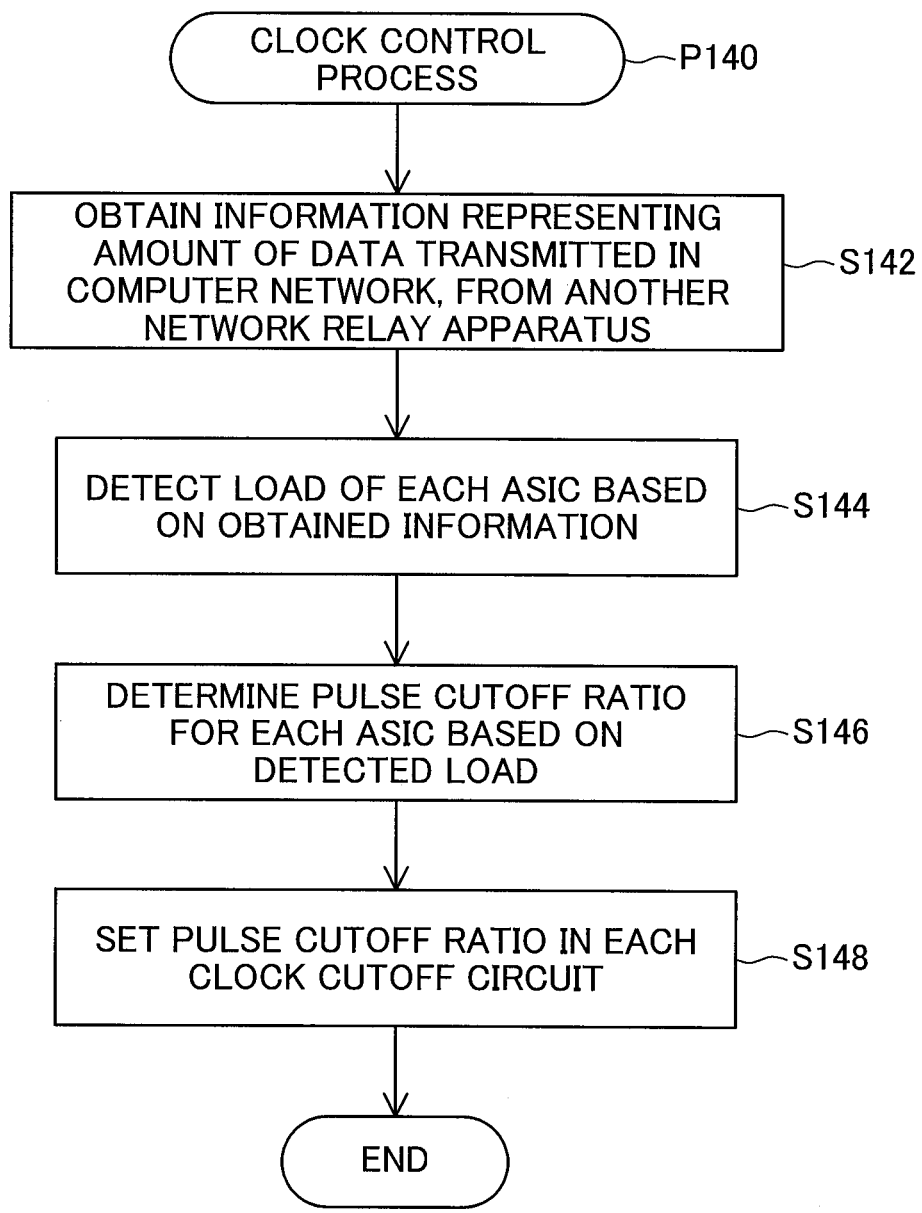
FIG. 9 is a flowchart showing clock control process according to the fourth embodiment.

FIG. 9 is a flowchart showing clock control process P140 according to the fourth embodiment. The clock control process P140 is performed to control the clock signal CS2 provided by the cutoff clock unit 720. According to this embodiment, the device controller 110 performs the clock control process P140 at regular intervals. According to another embodiment, the device controller 110 may perform the clock control process P140 based on a specified condition.

On the start of the clock control process P140, the device controller 110 operates as its information acquirer 118 to obtain information representing the amount of data transmitted in the computer network 900, from another network relay apparatus 10b (step S142). More specifically, the device controller 110 obtains information from another network relay apparatus 10b, which is received by the sending/receiving process circuit 510 via the physical I/F unit 512, via the control bus 200.

After obtaining the information from another network relay apparatus 10b (step S142), the device controller 110 operates as its load detector 112 to detect the load of each of the ASICs in the relay processing board 300 and the interface board 500, based on the information obtained from another network relay apparatus 10b (step S144). More specifically, information representing the relationship between the amount of data transmitted in the computer network 900 and the load of each ASIC is set in advance in the device controller 110. The device controller 110 refers to this information and detects the load of each of the ASICs in the relay processing board 300 and the interface board 500.

After detecting the load of each ASIC (step S144), like the second embodiment, the device controller 110 determines the pulse cutoff ratio for each of the ASICs in the relay processing board 300 and the interface board 500, based on the detected load (step S146).

After determining the pulse cutoff ratio for each ASIC (step S146), the device controller 110 sets the pulse cutoff ratio in each of the clock cutoff circuits 726 of the relay processing board 300 and the interface board 500 (step S148) and then terminates the clock control process P140.

As described above, like the second embodiment, the configuration of the fourth embodiment achieves power-saving of the network relay apparatus 10 according to the loads of the respective processing circuits (for example, forwarding destination determining circuit 320, packet processing circuit 340 and sending/receiving process circuit 510).

The information representing the amount of data transmitted in the computer network 900 is obtained from another network relay apparatus 10b. The operating frequencies of the respective processing circuits (for example, forwarding destination determining circuit 320, packet processing circuit 340 and sending/receiving process circuit 510) can thus be adjustable, based on the information from another network relay apparatus 10b.

E. Other Embodiments

The foregoing describes the embodiments of the invention. The invention is, however, not limited to these embodiments, but a multiplicity of variations and modifications may be made to the embodiments without departing from the scope of the invention.

For example, the processing circuits as the adjustment objects of the operating frequencies are not limited to the ASIC 310, the forwarding destination determining circuit 320, the packet processing circuit 340, the internal bus I/F circuits 326 and 346 or the sending/receiving process circuit 510. The adjustment of the operating frequency by the cutoff clock unit 720 may be adopted for other circuits in the network relay apparatus 10. The adjustment of the operating frequency by the cutoff clock unit 720 may also be adopted for a processing circuit including three or more partial circuits to detect the load of each of the three or more partial circuits and adjust the operating frequencies of the respective partial circuits.

Figure 10:
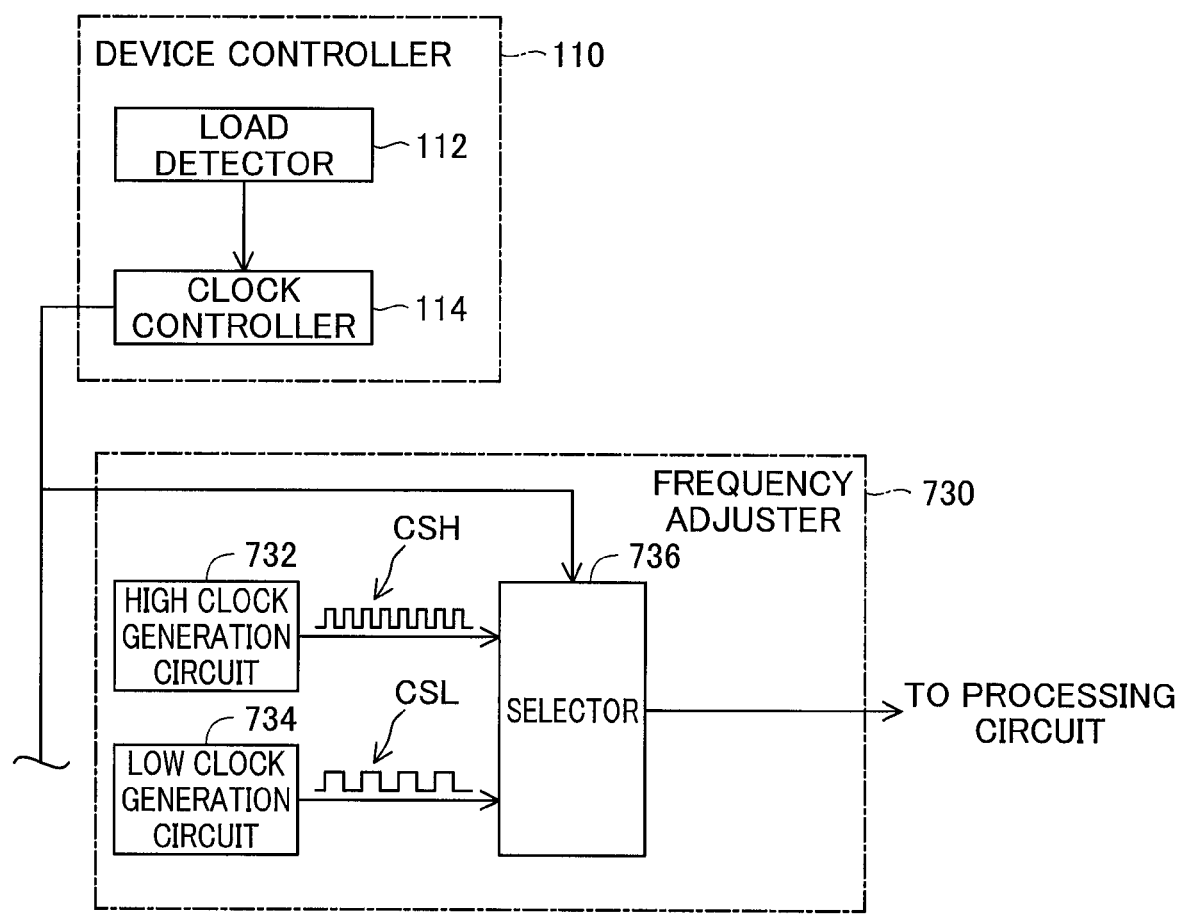
FIG. 10 illustrates the configuration of part of a network relay apparatus according to another embodiment.

The network relay apparatus 10 according to any of the above embodiments may be configured to switch over at least one of the oscillator, the multiplier and the frequency divider to adjust the frequency of the clock signal, instead of cutting off the clock pulses. FIG. 10 illustrates part of the configuration of a network relay apparatus 10 according to another embodiment. The network relay apparatus 10 of another embodiment shown in FIG. 10 has the similar configuration to that of the above embodiment, except a frequency adjuster 730 provided in place of at least one of the cutoff clock units 720.

The frequency adjuster 730 shown in FIG. 10 is configured to switch over at least one of the oscillator, the multiplier and the frequency divider and thereby adjust the frequency of the clock signal. The frequency adjuster 730 includes a high clock generation circuit 732, a low clock generation circuit 734 and a selector 736.

The high clock generation circuit 732 of the frequency adjuster 730 is configured to generate a clock signal CSH having the higher frequency than the frequency of the clock signal generated by the low clock generation circuit 734. The high clock generation circuit 732 includes at least one of an oscillator, a multiplier and a frequency divider and may share at least part of the oscillator, the multiplier and the frequency divider with the low clock generation circuit 734, another clock unit 710, another cutoff clock unit 720 or another frequency adjuster 730.

The low clock generation circuit 734 of the frequency adjuster 730 is configured to generate a clock signal CSL having the lower frequency than the frequency of the clock signal generated by the high clock generation circuit 732. The low clock generation circuit 734 includes at least one of an oscillator, a multiplier and a frequency divider and may share at least part of the oscillator, the multiplier and the frequency divider with the high clock generation circuit 732, another clock unit 710, another cutoff clock unit 720 or another frequency adjuster 730.

The selector 736 of the frequency adjuster 730 changes over the connection to a processing circuit between the high clock generation circuit 732 and the low clock generation circuit 734, in response to an instruction from the clock controller 114, so as to provide one of the clock signal CSH and the clock signal CSL to the processing circuit. This adjusts the frequency of the clock signal to the processing circuit. The frequency adjuster 730 may include another generation circuit configured to generate a clock signal having a different frequency from those of the clock signals CSH and CSL, in addition to the high clock generation circuit 732 and the low clock generation circuit 734, so as to adjust the frequency of the clock signal among the three or more frequencies.

What is claimed is:

1. A network relay apparatus, comprising:
a clock generation circuit configured to generate a clock signal having periodical clock pulses;
a processing circuit configured to operate in synchronism with the clock pulses to process data that is to be relayed by the network relay apparatus;
a load detector configured to detect a load of processing by the processing circuit; and
a clock cutoff circuit, which is different from the clock generation circuit, configured to cut off supply of a plurality of clock pulses in a cycle of the periodical clock pulses from the clock generation circuit to the processing circuit, to partially eliminate, from the plurality of clock pulses in the cycle, at least one clock pulse at a rate corresponding to the load detected by the load detector, and to provide the clock signal having the partially eliminated clock pulses to the processing circuit.

2. The network relay apparatus according to claim 1, wherein
the processing circuit includes a first partial circuit and a second partial circuit,
the load detected by the load detector is both a load of the first partial circuit and a load of the second partial circuit that are detected individually,
the clock generation circuit includes:
a first clock generation circuit configured to generate a first clock signal having first clock pulses, as a clock signal that is to be supplied to the first partial circuit; and
a second clock generation circuit configured to generate a second clock signal having second clock pulses, as a clock signal that is to be supplied to the second partial circuit, and
the clock cutoff circuit includes:

a first clock cutoff circuit that cuts off supply of the first clock pulses from the first clock generation circuit to the first partial circuit in order to partially eliminate the first clock pulses at a rate corresponding to the load of the first partial circuit detected by the load detector and provides the first clock signal having the partially eliminated first clock pulses to the first partial circuit; and a second clock cutoff circuit that cuts off supply of the second clock pulses from the second clock generation circuit to the second partial circuit in order to partially eliminate the second clock pulses at a rate corresponding to the load of the second partial circuit detected by the load detector and provides the second clock signal having the partially eliminated second clock pulses to the second partial circuit.

3. The network relay apparatus according to claim 1, wherein:

the clock generation circuit is configured to generate a plurality of clock signals respectively having different frequencies, and the clock cutoff circuit is configured to cut off supply of respective clock pulses of the plurality of clock signals from the clock generation circuit to the processing circuit to partially eliminate the respective clock pulses of the plurality of clock signals synchronously at a rate corresponding to the load detected by the load detector and provide the plurality of clock signals having the respective partially eliminated clock pulses to the processing circuit.

4. The network relay apparatus according to claim 1, wherein the processing circuit includes a buffer circuit configured to temporarily store information that is to be processed by the processing circuit, and the load detector is configured to detect the load based on an amount of data stored in the buffer circuit.

5. The network relay apparatus according to claim 1, further comprising a data receiver configured to receive data that is to be relayed by the network relay apparatus, from a line, wherein the load detector is configured to detect the load based on an amount of the data received by the data receiver.

6. The network relay apparatus according to claim 1, further comprising an information acquirer configured to obtain information representing an amount of data transmitted in a computer network, from another network relay apparatus that cooperates with the network relay apparatus to construct the computer network, wherein the load detector is configured to detect the load, based on the information obtained by the information acquirer.

7. The network relay apparatus according to claim 1, wherein the processing circuit includes an interface circuit configured to mediate transmission of information to and from an additional circuit that is different from the processing circuit, and frequency of a clock signal used to drive the interface circuit is controlled to remain constant before and after the cutoff by the clock cutoff circuit.

8. A control method of a network relay apparatus, comprising steps of:

activating a clock generation circuit of the network relay apparatus to generate a clock signal having periodical clock pulses;

operating a processing circuit of the network relay apparatus in synchronism with the clock pulses to process data that is to be relayed by the network relay apparatus;

detecting, by a load detector of the network relay apparatus, a load of processing by the processing circuit; and cutting off, by a clock cutoff circuit of the network relay apparatus, which is different from the clock generation circuit, supply of a plurality of clock pulses in a cycle of the periodical clock pulses from the clock generation circuit to the processing circuit;

partially eliminating, by the clock cutoff circuit, at least one clock pulse from the plurality of clock pulses in the cycle at a rate corresponding to the detected load; and providing, by the clock cutoff circuit, the clock signal having the partially eliminated clock pulses to the processing circuit.

9. A network relay apparatus, comprising:

a clock generation circuit configured to generate a first clock signal having periodical clock pulses that include a plurality of clock pulses in a cycle of the periodical clock pulses;

a processing circuit configured to process data that is to be relayed by the network relay apparatus and include an interface circuit operating to mediate transmission of information to and from an additional circuit that is different from the processing circuit;

a load detector configured to detect a load of processing by the processing circuit; and a frequency adjuster, which is different from the clock generation circuit, configured to adjust frequency of the first clock signal used to drive the processing circuit by partially eliminating at least one clock pulse from the plurality of clock pulses in the cycle, according to the load detected by the load detector, wherein frequency of a second clock signal used to drive the interface circuit is controlled to remain constant before and after the adjustment of the frequency of the first clock signal according to the load by the frequency adjuster.

10. The network relay apparatus according to claim 9, wherein the frequency adjuster is configured to switch over at least one of an oscillator, a multiplier and a frequency divider to adjust the frequency of the first clock signal.

11. The network relay apparatus according to claim 9, wherein the frequency adjuster cuts off supply of clock pulses of the first clock signal to the processing circuit to adjust the frequency of the first clock signal.

* * * * *